United States Patent
Lin et al.

(10) Patent No.: US 11,645,677 B2
(45) Date of Patent: *May 9, 2023

(54) EXPECTED ACTIVITY OF A USER

(71) Applicant: Google LLC, Mountain View, CA (US)

(72) Inventors: Dong Lin, Mountain View, CA (US); Shankar R. Ponnekanti, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/111,127

(22) Filed: Dec. 3, 2020

(65) Prior Publication Data

US 2021/0090129 A1 Mar. 25, 2021

Related U.S. Application Data

(63) Continuation of application No. 16/983,637, filed on Aug. 3, 2020, now Pat. No. 11,222,364, which is a continuation of application No. 15/816,680, filed on Nov. 17, 2017, now Pat. No. 10,769,673, which is a continuation of application No. 14/701,824, filed on May 1, 2015, now Pat. No. 9,852,452, which is a
(Continued)

(51) Int. Cl.
*G06F 15/16* (2006.01)
*G06Q 30/0251* (2023.01)
*H04L 69/329* (2022.01)

(52) U.S. Cl.
CPC ..... *G06Q 30/0269* (2013.01); *G06Q 30/0255* (2013.01); *G06Q 30/0271* (2013.01); *H04L 69/329* (2013.01)

(58) Field of Classification Search
CPC .......... G06Q 30/0269; G06Q 30/0255; G06Q 30/0271; H04L 69/329
See application file for complete search history.

(56) References Cited

U.S. PATENT DOCUMENTS

| 6,385,592 B1 | 5/2002 | Angles et al. |
| 7,668,950 B2 | 2/2010 | Horowitz et al. |
| 7,876,214 B1 | 1/2011 | Brady |

(Continued)

FOREIGN PATENT DOCUMENTS

KR 10-2011-0069245 6/2011

OTHER PUBLICATIONS

International Search Report and Written Opinion in International Application No. PCT/US2013/033345, dated Jul. 23, 2013, 14 pages.

*Primary Examiner* — John B Walsh
(74) *Attorney, Agent, or Firm* — Fish & Richardson P.C.

(57) ABSTRACT

Methods, systems, and apparatus, including computer programs encoded on a computer-readable storage medium, for serving content to a user. A method includes: receiving a request for content from a user, the content to be displayed in a slot associated with an online resource; determining an expected activity score for the user based at least in part on one or more criteria associated with a context of presenting the online resource to the user; comparing the expected activity score for the user to a threshold; selecting one or more content items to serve to the user based at least in part on the comparison; and serving the selected content items to the user responsive to the request.

18 Claims, 6 Drawing Sheets

Related U.S. Application Data continuation of application No. 13/675,102, filed on Nov. 13, 2012, now Pat. No. 9,047,620.

(60) Provisional application No. 61/613,924, filed on Mar. 21, 2012.

(56) References Cited

U.S. PATENT DOCUMENTS

| | | |
|---|---|---|
| 7,882,175 B1 | 2/2011 | Nayfeh et al. |
| 8,209,277 B2 | 6/2012 | Kumar |
| 8,315,905 B1 | 11/2012 | Adair |
| 8,478,849 B2 | 7/2013 | Marl et al. |
| 8,640,032 B2 | 1/2014 | Priyadarshan |
| 8,645,516 B2 | 2/2014 | Bechtel et al. |
| 8,781,301 B2 | 7/2014 | Fujita |
| 8,984,098 B1 | 3/2015 | Tomkins et al. |
| 10,769,673 B2 * | 9/2020 | Lin .................. G06Q 30/0255 |
| 2005/0149397 A1 | 7/2005 | Morgensten et al. |
| 2006/0074839 A1 | 4/2006 | Pursche et al. |
| 2008/0209351 A1 | 8/2008 | Macadaan et al. |
| 2009/0150214 A1 | 6/2009 | Mohan |
| 2009/0187463 A1 | 7/2009 | DaCosta |
| 2010/0138294 A1 | 6/2010 | Bussmann et al. |
| 2010/0235241 A1 | 9/2010 | Wang et al. |
| 2011/0035272 A1 | 2/2011 | Bhatt |
| 2011/0218865 A1 | 9/2011 | Muthukrishnan et al. |
| 2011/0282727 A1 | 11/2011 | Phan et al. |
| 2012/0030036 A1 | 2/2012 | Priyadarshan et al. |
| 2012/0054627 A1 | 3/2012 | Priyadarshan et al. |
| 2014/0282870 A1 | 9/2014 | Markwordt et al. |

* cited by examiner

EXPECTED ACTIVITY OF A USER

CROSS-REFERENCE TO RELATED APPLICATION

This application is a continuation application of, and claims priority to, U.S. patent application Ser. No. 16/983,637, titled "EXPECTED ACTIVITY OF A USER," filed on Aug. 3, 2020, which is a continuation application of, and claims priority to, U.S. patent application Ser. No. 15/816,680, now U.S. Pat. No. 10,769,673, titled "EXPECTED ACTIVITY OF A USER," filed on Nov. 17, 2017, which application is a continuation application of, and claims priority to, U.S. patent application Ser. No. 14/701,824, now U.S. Pat. No. 9,852,452, titled "EXPECTED ACTIVITY OF A USER," filed on May 1, 2015, which application is a continuation application of, and claims priority to, U.S. patent application Ser. No. 13/675,102, now U.S. Pat. No. 9,047,620, titled "EXPECTED ACTIVITY OF A USER," filed on Nov. 13, 2012, which application claims priority to U.S. Provisional Application No. 61/613,924, filed on Mar. 21, 2012. The disclosure of the prior applications are considered part of and are incorporated by reference in the disclosure of this application.

BACKGROUND

This specification relates to content management.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors, such as through a reservation system, an auction system, or a combination of these. For example, content sponsors can provide bids specifying amounts that the sponsors are respectively willing to pay for presentation of their content. In turn, a reservation can be made or an auction can be performed, and the slots can be allocated to sponsors according, among other things, to their bids, reservation information, and/or the relevance of the sponsored content to content presented on a page hosting the slot or a request that is received for the sponsored content.

SUMMARY

In general, one innovative aspect of the subject matter described in this specification can be implemented in methods that include a method for serving content. The method comprises: receiving a request for content from a user, the content to be displayed in a slot associated with an online resource; determining an expected activity score for the user based at least in part on one or more criteria associated with a context of presenting the online resource to the user; comparing the expected activity score for the user to a threshold; selecting one or more content items to serve to the user based at least in part on the comparison; and serving the selected content items to the user responsive to the request.

In general, one innovative aspect of the subject matter described in this specification can be implemented in methods that include a method for serving content. The method comprises: presenting a user interface to a content sponsor for designating one or more first criteria for enabling presentation of content associated with a campaign to users, including presenting a control, that when selected, enables presentation of content from the campaign to users having expected activity scores that are above a predefined level; storing the campaign; and serving content to users responsive to requests for content from the campaign when the users have expected activity scores above the predefined level.

In general, another aspect of the subject matter described in this specification can be implemented in computer program products that include a computer program product tangibly embodied in a computer-readable storage device. The computer program product can include instructions that, when executed by a processor, cause the processor to: receive a request for content from a user, the content to be displayed in a slot associated with an online resource; determine an expected activity score for the user based at least in part on one or more criteria associated with a context of presenting the online resource to the user; compare the expected activity score for the user to a threshold; select one or more content items to serve to the user based at least in part on the comparison; and serve the selected content items to the user responsive to the request.

In general, another aspect of the subject matter described in this specification can be implemented in systems. A system includes a content management system, an activity information datastore, and a campaign parameters datastore. The content management system is configured to: provide a user interface to a content sponsor for designating one or more criteria for enabling presentation of content associated with a campaign to users, including providing a control, that when selected, enables presentation of content from the campaign to users having expected activity scores that are above a predefined level; store the criteria in the campaign parameters datastore; receive a request for content from a user, the content to be displayed in a slot associated with an online resource; determine an expected activity score for the user based at least in part on one or more criteria associated with a context of presenting the online resource to the user and on information related to the user in the activity information datastore; compare the expected activity score for the user to a threshold; select one or more content items to serve to the user based at least in part on the comparison; and serve the selected content items to the user responsive to the request.

These and other implementations can each optionally include one or more of the following features. The expected activity score can be a prediction of an expected interaction rate of the user given the context. The expected activity score can be determined based on a number of interactions by the user versus a number of opportunities for interaction in a time period. The time period can be a recent time period, from a present point in time back a pre-defined amount of time in the past. The expected activity score can be weighted based on dates of activities associated with the user, with more recent activities weighted higher than less recent activities. The expected activity score can be determined based on user interactions of other users that are similar to the user. The threshold can correspond to a recent expected activity score determined for the user, where the recent expected activity score is determined based on user interactions by the user in a recent time period and where the recent time period is shorter than the time period. The threshold can correspond to an average expected activity score determined for multiple users. The average expected activity score can be determined based on presentations of content made in the context. The threshold can be a predetermined expected activity level. The threshold can be a predetermined click through rate. Action-soliciting content can be served to the user responsive to the request when the expected activity score is at or above the threshold. Informative content can be served to the user responsive to the request when the expected activity score is below the threshold. The criteria can be selected from time of day, time of week, time of month, time of year, or location of the user. The criteria can relate to subject matter associated with the online resource.

Particular implementations may realize none, one or more of the following advantages. A content sponsor can configure a content campaign to provide content to users who have an expected activity score above a predefined level. Informational content, including content that does not solicit a direct response, can be served to users who have an expected activity score below a predefined level. Sponsored content that solicits a direct response from the user, such as advertisement content, can be served to users who have an expected activity score above a predefined level.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A user interface can be presented to a content sponsor for designating one or more criteria for providing content associated with a campaign to users. The user interface can include, for example, one or more controls, that when selected, can be used to determine when content from the campaign is delivered to users, such as when the user has an expected activity score that is above a predefined target level. Campaign selections made by the content sponsor can be stored. Subsequent to the storing, a request for content can be received from a user, where the content is to be displayed, for example, in a slot associated with a resource (e.g., a web property).

An expected activity score can be determined for the user based at least in part on one or more criteria associated with a context of presenting the resource to the user. For example, the expected activity score can be determined based on one or more of subject matter related to the resource, the time of the request, or the location of the request. If the expected activity score for the user is at or above a predefined level, a first type of content can be served to the user in response to the request. For example, action-soliciting content, such as a click-to-convert advertisement (as opposed to informational content) can be served to the user since the expected activity score being above the threshold indicates a likelihood that the user may interact with the action-soliciting content. In some implementations, an expected activity score can be calculated with reference to a particular content item, a particular user, a particular resource, or particular subject matter. Other variants are possible.

For situations in which the systems discussed here collect personal information about users or user devices, the users may be provided with an opportunity to opt in/out of programs or features that may collect personal information (e.g., information about a user's preferences, a user's current location, or a user's activities such as interactions with content items). In addition, certain data may be anonymized in one or more ways before it is stored or used so that personally identifiable information is removed. For example, a user's identity may be anonymized so that no personally identifiable information can be determined for the user, or a user's geographic location may be generalized where location information is obtained (such as to a city, zip code, or state level), so that a particular location of the user cannot be determined.

Figure 1:
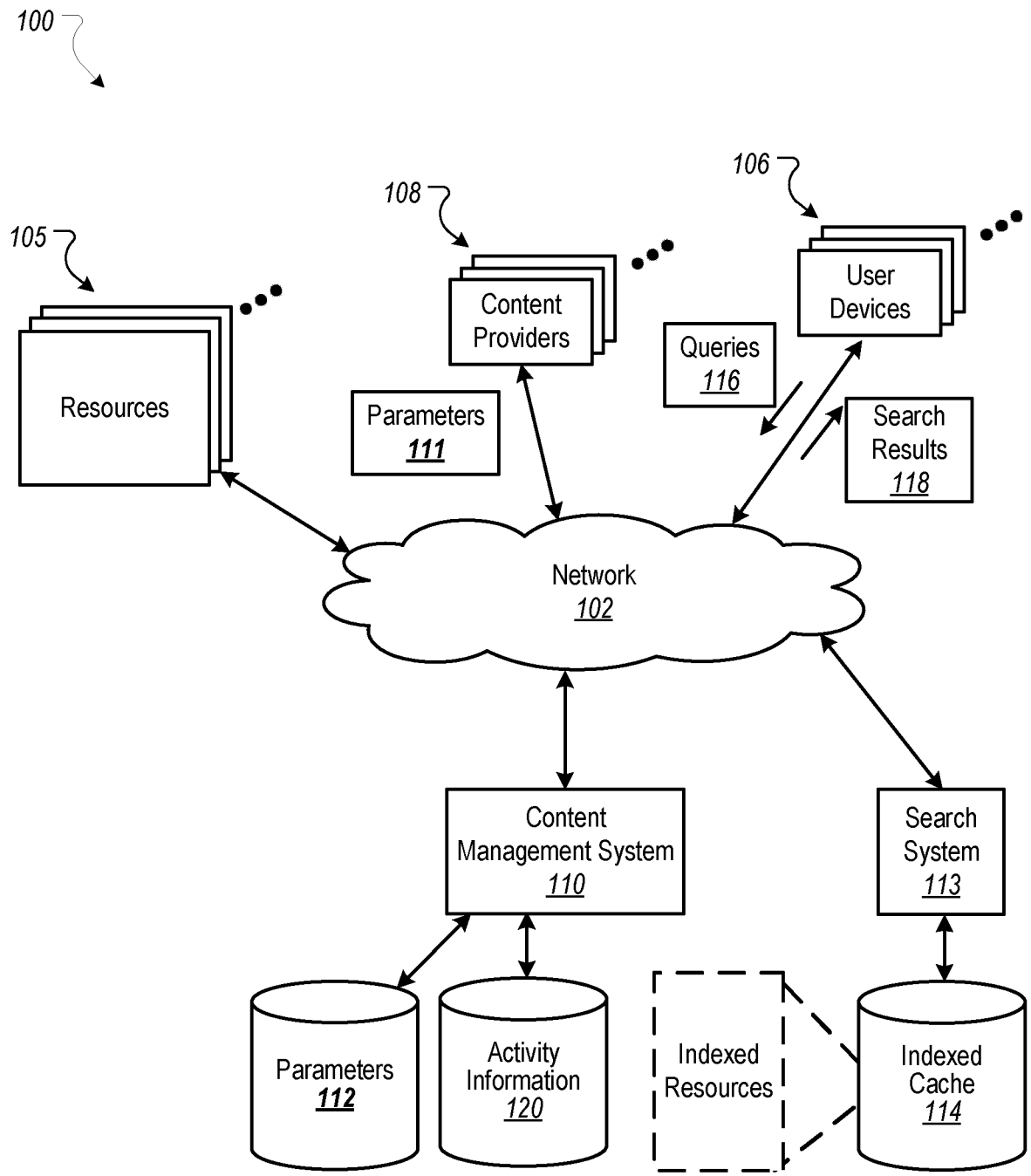
FIG. 1 is a block diagram of an example environment for providing content to a user.

FIG. 1 is a block diagram of an example environment 100 for providing content to a user. The example environment 100 includes a content management system 110 that manages content services. The example environment 100 includes a network 102, such as a local area network (LAN), a wide area network (WAN), the Internet, or a combination thereof. The network 102 connects resources 105 (e.g., websites), user devices 106, content providers 108, and the content management system 110. The example environment 100 may include many thousands of resources 105, user devices 106, and content providers 108.

A content provider 108 or campaign sponsor can create a content campaign using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

The content provider 108 can, using the account management user interfaces, provide campaign parameters 111 which define the content campaign. The campaign parameters 111 can include, for example, one or more content items (e.g., creatives), a campaign name, a preferred content network for placing content, a budget for the campaign, start and end dates for the campaign, a schedule for content placements, and bids for one or more content items. The parameters 111 can also include, for example, criteria which specify a context in which the content provider 108 desires content items to be displayed. The criteria can include, for example, a user language, one or more geographical locations or websites, one or more verticals, one or more networks on which to provide content, and/or one or more keywords. As another example, the criteria can specify that the content provider 108 desires some or all content items in the campaign to be displayed to users having an expected activity score above a threshold. The expected activity score can represent a prediction of an expected interaction rate of the user given the context in which the content is to be displayed.

The criteria and other campaign parameters 111 can be stored in a parameters data store 112. The content campaign can be created and activated for the content provider 108 according to the parameters 111 specified by the content provider 108. As described in more detail below, in response to user requests for content, content can be served from the content campaign, such as when the users have expected activity scores above a threshold.

Continuing with the description of the environment 100, a resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, images and sounds, that may include embedded information (such as meta-information in hyperlinks) and/or embedded instructions (such as JavaScript scripts). A website, for example, can include one or more resources 105 associated with a domain name and hosted by one or more servers. An example website is a collection of web pages formatted in hypertext markup language (HTML) that can contain text, images, multimedia content, and programming elements, such as scripts. Each website can be maintained by a content publisher, which is an entity that controls, manages and/or owns the website.

A user device 106 is an electronic device that is under control of a user and is capable of requesting and receiving resources over the network 102. Example user devices 106 include personal computers, mobile communication devices (e.g., smartphones, tablet computers, personal digital assistants), and other network-connected computing devices, including set-top boxes, watches, kiosks, billboards, and video game consoles, among other devices that can send and receive data over the network 102. A user device 106 typically includes one or more user applications, such as a web browser, to facilitate the sending and receiving of data over the network 102.

A user device 106 can request a resource 105, for example, from a website. In turn, data representing the resource 105 can be provided to the user device 106 for presentation by the user device 106. The data representing the resource 105 can also include data specifying a portion of the resource 105 or a portion of a user display, such as a presentation location of a pop-up window or a portion of the resource 105, in which alternative content (e.g., advertisements) can be presented. These specified portions of the resource 105 or user display can be referred to as content item slots. When the alternative content is an advertisement, the specified portions of the resource 105 or user display can be referred to as advertisement slots.

To facilitate searching of resources, the environment 100 can include a search system 113 that identifies resources 105 by crawling and indexing resources 105 provided by the content publishers, e.g., on one or more websites. Data about the resources 105 can be indexed based on the resource to which the data corresponds. The indexed and, optionally, cached copies of the resources 105 can be stored in an indexed cache 114.

User devices 106 can submit search queries 116 to the search system 113 over the network 102. In response, the search system 113 accesses the indexed cache 114 to identify resources that are relevant to the search query 116. The search system 113 identifies the resources in the form of search results 118 and returns the search results 118 to the user devices 106 in search results pages. A search result 118 is data generated by the search system 113 that identifies a resource that is responsive to a particular search query, and includes a link to the resource. An example search result 118 can include a web page title, a snippet of text or a portion of an image extracted from the web page, and the URL of the web page. Search results pages can also include one or more alternative content slots in which content items (e.g., advertisements) can be presented.

When a resource 105 or search results 118 are requested by a user device 106, the content management system 110 receives a request for one or more content items to be provided with the resource 105 or search results 118. The request for content items can include, for example, characteristics of the content item slots that are defined for the requested resource or search results page, and can be provided to the content management system 110. For example, a reference (e.g., URL) to the resource for which the content item slot is defined, a size of the content item slot, and/or media types that are available for presentation in the content item slot can be provided to the content management system 110.

As another example, keywords associated with a requested resource ("resource keywords") or a search query 116 for which search results are requested can also be provided to the content management system 110 to facilitate identification of content items that are relevant to the resource or search query 116. Other information which identifies a context of the request for content can be provided to the content management system 110. For example, location information describing the location of the requesting user device 106 can be provided. As another example, the request can include a user identifier (e.g., cookie) of the user of the user device 106. Time and date information for the request can also be provided to or can be determined by the content management system 110.

The content management system 110, in response to receiving a request for content from a user device 106, can determine an expected activity score for the user of the user device 106. The expected activity score can be determined, at least in part, on one or more criteria associated with the context of the request. For example, the content management system 110 can determine an expected activity score for the user based on information that is retrieved from an activity information database 120. An expected activity score can be determined for a user or a user device, for example, as a ratio of the number of previous interactions with content items in a same context as the current request to the number of impressions presented to the user or user device in the context over a particular period of time.

In some implementations, a recent period of time can be used (e.g., the past week), and the expected activity score can be an indication of the user's recent activity. Whether the time period is a recent time period or a longer time period (e.g., the past year), the expected activity score can be weighted based on dates of activities associated with the user, for example, with more recent activities weighted higher than less recent activities. As another example, if the activity information database 120 includes no data or some but less than a threshold amount of data for the user, an estimated expected activity score for the user can be determined, for example, by identifying a group of users that are similar to the user (e.g., based on user demographics, interests, activity, and other user-profile information) and determining an average expected activity score for the group of users.

The content management system 110 can compare the expected activity score for the user to one or more thresholds. For example, a threshold can be a predetermined activity score, such as a particular click through rate (e.g., 10%). Other examples include comparing the expected activity score for the user to predetermined user activity quartile rankings, or to one or more thresholds associated with one or more other types of groupings. The content management system 110 can determine whether the expected activity score for the user meets or exceeds the threshold. If the expected activity score exceeds the threshold, the content management system 110 can select one or more content items of one or more types of content, such as action-soliciting content, to serve to the user.

If the expected activity score is less than the threshold, a second type of content (e.g., informative content) can be served to the user in response to the request. For example, for users that may not be likely to interact with content, content that is more informative can be served rather than content which solicits a direct response from the user. A user that has a low expected activity score may, for example, be less likely to interact with content items due to, for example, reluctance to make purchases online, such as due to personal preference. Displaying informative content to such a user can increase the likelihood that the user is interested in and will receive such content.

Other types of thresholds can be used. For example, a threshold can be or can be based on an average expected activity score determined for a group of users. The content management system 110 can compare the user's expected activity score to the average expected activity score, for example, to determine whether the user is expected to be more or less active than an average user. The average expected activity score can be determined for the group of users based on information from the activity information database 120, such as information relating to individuals (or devices) that have a same or similar context to the context of the current request.

In some implementations, expected activity scores can be used as a criterion to determine eligible content items. In some implementations, expected activity scores can be used as a screening mechanism for content items already determined to be eligible. For example, based at least in part on data included in the request for content items, the content management system 110 can select content items that are eligible to be provided in response to the request. For example, eligible content items can include content items having characteristics matching the characteristics of content item slots and that are identified as relevant to specified resource keywords or search queries 116. In some implementations, content items having keywords that match the resource keywords or the search query 116 are selected as eligible content items by the content management system 110.

A keyword can match a resource keyword or a search query 116 by having the same textual content ("text") as the resource keyword or search query 116. For example, a content item associated with the keyword "beaches" can be an eligible content item for a content item request including the resource keyword "beaches." Similarly, the content item can be selected as an eligible content item for a content item request including the search query "beaches."

The content management system 110 can select from the eligible content items that could be provided for presentation in content item slots of a resource or search results page based on results of an auction. For example, the content management system 110 can receive bids from content providers 108 and can allocate the content item slots, based at least in part on the received bids (e.g., based on the highest bidders at the conclusion of the auction). The bids are amounts that the content providers 108 are willing to pay for presentation (or selection) of their content item with a resource or search results page. For example, a bid can specify an amount that a content provider 108 is willing to pay for each 1000 impressions (i.e., presentations) of a content item, referred to as a CPM bid. Alternatively, a bid can specify an amount that the content provider 108 is willing to pay for a selection (i.e., a click-through) of the content item or a "conversion" following selection of the content item. The selected content items can be determined based on the bids alone, or based on the bids of each bidder being multiplied by one or more factors, such as quality scores derived from content item performance, landing page scores, and/or other factors. A content provider 108 can, for example, provide a bid for presentation or selection of a content item to a user having an expected activity score above a particular level.

Figure 2:
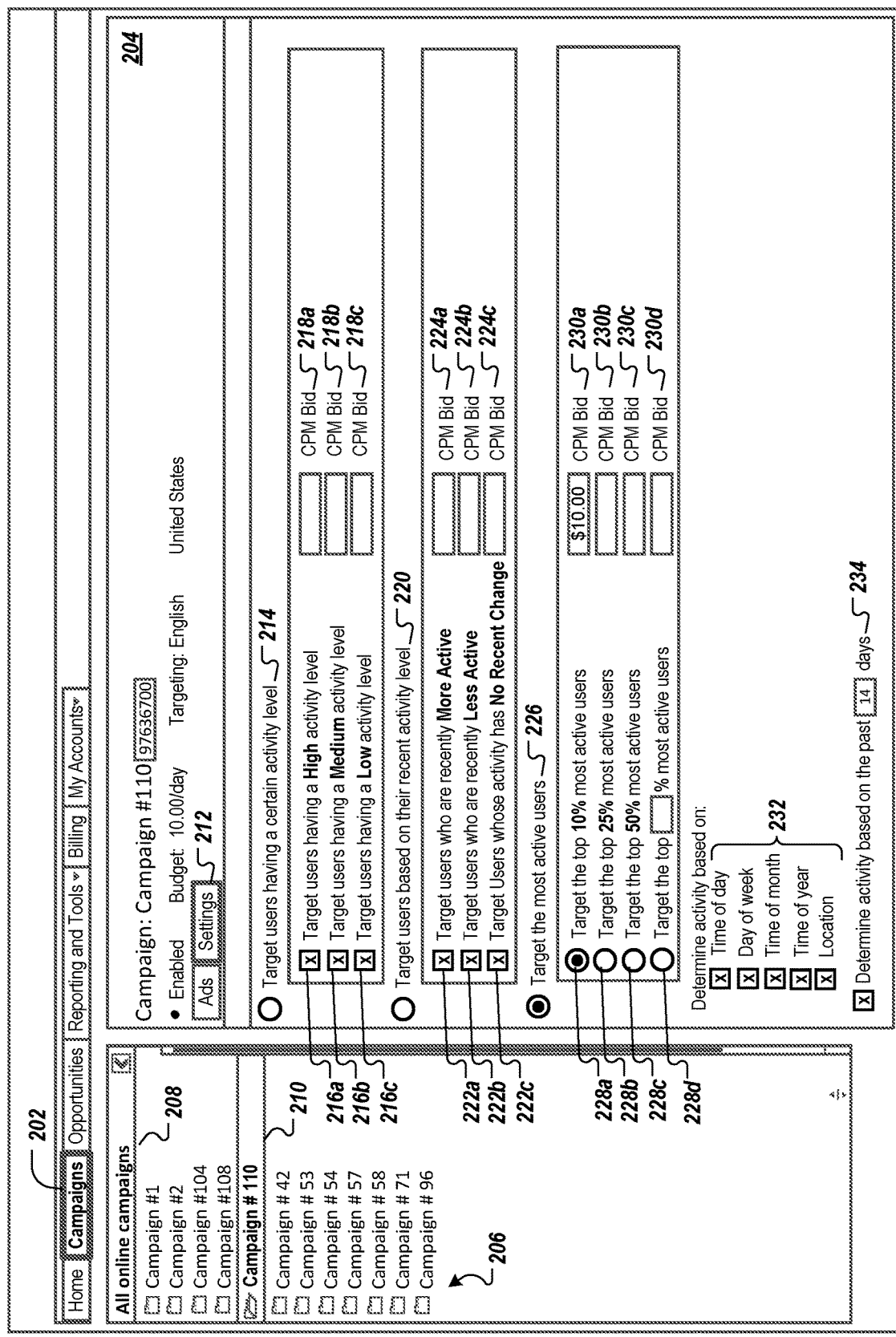
FIG. 2 illustrates an example content sponsor user interface.

FIG. 2 illustrates an example content sponsor user interface 200. The user interface 200 can be included, for example, in one or more user interfaces that a content sponsor can use to configure a content campaign. The content sponsor can select a tab 202 to display a campaign area 204. The content sponsor can view a list 206 of campaigns by selecting a control 208. The content sponsor can edit an existing campaign in the campaign area 204 by selecting the name of an existing campaign (e.g., a name 210) in the campaign list 206. The content sponsor can select a control 212 to configure settings for the selected campaign.

Among other settings, the content sponsor can configure criteria for presenting content associated with the selected campaign to users, such as by making selections using one or more controls presented in the user interface 200. Some criteria can relate to an expected activity score determined for a user. For example, the content sponsor can select a control 214 to present content to users having at least a particular activity level.

The content sponsor can select one or more of controls 216*a*, 216*b*, and 216*c* to present content to users having a "high", "medium", or "low" expected activity score, respectively, where each of "high", "medium", and "low" can correspond to a predefined activity level or range of activity levels. For example, "high" can correspond to a click through rate of 15% or more, "medium" can correspond to a click through rate of 5% to 15%, and "low" can correspond to a click through rate of less than 5%. In some implementations, the content sponsor can provide a custom activity level (e.g., a click through rate of 20%) for presenting content to users having expected activity scores higher than the custom activity level. The content sponsor can, for each of the controls 216*a*, 216*b*, and 216*c*, provide an associated bid, using a respective control 218*a*, 218*b*, or 218*c*. In some implementations, other types of user groupings can be used, such as top-third, middle-third, and bottom-third of users with respect to activity level.

The content sponsor can select a control 220 to enable presentation of content to users based on their recent activity level. For example, the content sponsor can select a control 222*a* to present content to users who are recently more active (e.g., users whose recent level of activity exceeds a historical level of activity). Similarly, the content sponsor can select a control 222*b* to present content to users who are recently less active (e.g., users whose recent level of activity is less than a historical level of activity). A control 222*c* can be selected to present content to users whose recent level of activity is the same as or similar to a historical level of activity. The content sponsor can, for each of the controls 222a, 222b, and 222c, provide an associated bid, using a respective, associated control 224a, 224b, or 224c.

The content sponsor can select a control 226 to enable presentation of content to users who are determined to be the "most active users" (e.g., a user having a top N % expected activity score as compared to expected activity scores of other users). For example, the content sponsor can select one of controls 228a, 228b, and 228c to present content to users having an expected activity score in the top 10%, 25%, or 50% of user expected activity scores, respectively. As another example, the content sponsor can select a control 228d and provide a custom percentage (e.g., X %) to present content to users having an expected activity score in the top X % of user expected activity scores. The content sponsor can, for each of the controls 228a, 228b, 228c, and 228d, provide an associated bid, using a respective, associated control 230a, 230b, 230c, or 230d.

The content sponsor can select one or more of a set of controls 232 to configure whether one or more of respective context criterion of the time of day, the day of week, the time of month, the time of year, or the location of a request are used when determining an expected activity score of a user. A control 234 can be selected and a number of days can be provided to configure the system such that expected activity scores are determined based on the specified number of days of most recent activity of a user.

Other configurations relating to expected activity can be made using the user interface 200 or another user interface. For example, the content sponsor can configure whether more recent activity is weighted higher than less recent activity (and in some implementations, can configure a meaning of "recent" and can configure how much to weight recent activity as compared to less recent activity). As another example, the content sponsor can select particular content items or particular types of content items from the campaign to present to users in association with one or more particular configurations. Although the example of FIG. 2 illustrates the settings configured using the user interface 200 as applying to all content items included in the campaign 210, in some implementations, the content sponsor can configure different settings for multiple groups of content items included in the campaign 210. For example, a content sponsor can configure first settings for action-soliciting content items included in the campaign 210 and second settings for informational content items included in the campaign 210.

Figure 3:
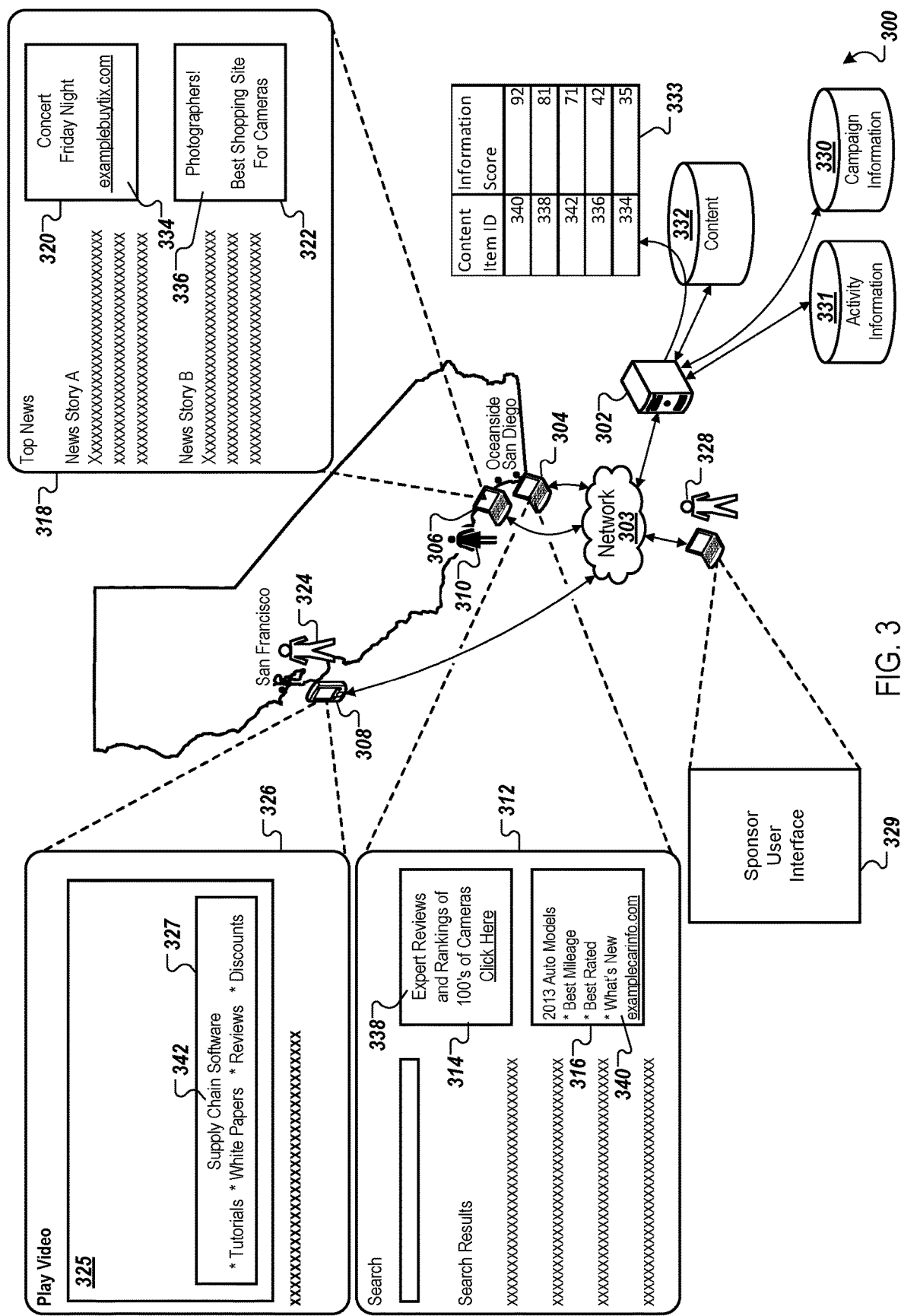
FIG. 3 illustrates an example system for serving content.

FIG. 3 illustrates an example system 300 for serving content. A content management system 302 can receive, over a network 303, a request for content from one or more of example user devices 304, 306, and 308. For example, a user 310, while at work in San Diego, may use the user device 304 to perform a search using a search engine. Search results generated in response to the search can be displayed on a user interface 312 on the user device 304. The content management system 302 can receive two requests to provide two content items for display in two content item slots 314 and 316, respectively.

As another example, the user 310 can, while at home in Oceanside, use the user device 306 to view a news web site (e.g., on a user interface 318). The content management system 302 can receive, for example, two requests to provide two content items for display in two content item slots 320 and 322, respectively. As yet another example, a user 324 who lives in San Francisco can view a video content item 325 on a user interface 326 of the user device 308 and the content management system 302 can receive a request to provide a content item to display in an associated content item slot 327.

In some implementations, the content management system 302 can provide, to a content sponsor 328 (e.g., an advertiser), a user interface 329 that the content sponsor 328 can use to configure criteria for enabling presentation of one or more content items from a campaign. For example, the user interface 329 can allow the content sponsor 328 to present content to users who have at least a particular expected activity score. The user interface 329 can be the same as or similar to the user interface 200 described above with respect to FIG. 2. The content management system 302 can store the information associated with the choices the content sponsor 328 makes using the user interface 329 in an information data store 330. In response to subsequent requests for content, the content management system 302 can select one or more content items from the campaign if the requests satisfy the criteria provided by the content sponsor 328.

A request for content received by the content management system 302 can include a timestamp of when the request was received or, as another example, the content management system 302 can determine the time at which the request was received. Other time-related information can be identified or determined, such as a date, a day of week, a time of month, a time of year, or a general time of day (e.g., morning, evening, first-shift working hours, non-first-shift-working hours, etc.) related to the request. For example, the content management system 302 can identify or determine that the requests to provide content items for the content slots 314 and 316 were received during a weekday morning and the requests to provide content items for the content slots 320 and 322 were received during a weekday evening. In some implementations, a request for content can include information identifying the location associated with the request. For example, the content management system 302 can identify locations of San Diego, Oceanside, and San Francisco, corresponding to requests received from the user devices 304, 306, and 308, respectively.

In response to a request for content, the content management system 302 can determine an expected activity score associated with the user/user device that made the request. The expected activity score can indicate a level of activity (or inactivity) of a user/device with regard to interaction (e.g., clicks, conversions, and other interactions) with content items that have been previously presented to the user/device by the content management system 302 in a context that is the same or similar to the context of the request. In some implementations, the expected activity score can be determined based on a number of interactions by the user/device versus a number of opportunities for interaction in a time period. That is, the expected activity score can be a historical activity score. The time period can be a recent time period (e.g., the past week) or a longer time period (e.g., the past year). In some implementations, both a recent expected activity score and an expected activity score based on a longer time period can be determined.

The content management system 302 can, for example, in response to a request for content for the content item slots 314 and 316 received at 10:00 AM on a Monday morning from the user device 304 at the San Diego work location of the user 310, determine the San Diego location, determine or identify the user 310, and determine a weekday morning timeframe. The content management system 302 can access recorded activity information for the user 310/device 304 from an activity information datastore 331 and can determine that in the past year that the user 310/device 304 has been presented three hundred twelve impressions during weekday mornings when in San Diego and has interacted with seven of them (e.g., for a historical/expected activity score of 2.24 percent for interactions occurring in San Diego on weekday mornings).

When the activity information datastore 331 has no data or less than a threshold amount of data for the user 310 that is related to the context of the request, the content management system can determine an estimated expected activity score for the user 310. For example, the content management system 302 can identify a group of users that are similar to the user 310/device 304 and can determine an average expected activity score for the group of users/ devices based on previous activity made by the users/ devices in a same or similar context to the context of the request. For example, the content management system 302 can determine that for a group of users that have been previously served content in San Diego on weekday mornings, on average, those users interacted with such content at a rate of 6%.

As another example, the content management system 302 can, in response to a request for content for the content item slots 320 and 322 received at 9:00 PM on a Tuesday evening from the user device 306 at the Oceanside home location of the user 310, determine the Oceanside location, determine or identify the user 310/device 306, and determine a weekday evening timeframe. The content management system 302 can access recorded activity information for the user 310/ device 306 from the activity information datastore 331 and can determine that in the past month that the user 310/device 306 has been presented one hundred eighty impressions during weekday mornings when in Oceanside and has interacted with twenty four of them (e.g., for a historical/ expected activity score of 13.3 percent for interactions occurring in Oceanside on weekday evenings).

As yet another example, the content management system 302 can, in response to a request for content for the content item slot 327 received at 2:00 PM on a Saturday morning in June, in San Francisco, from the user 324/device 308, determine the San Francisco location, determine or identify the user 324/device 308, determine a content network (e.g., a video network) on which to display content, determine a time of year (e.g., a summer season), and determine a weekend timeframe. The content management system 302 can access recorded activity information for the user 324/ device 308 from the activity information datastore 331 and can determine that in the past year that the user 324/device 308 has been presented four hundred fifty two content items on a video network during summer weekends when in San Francisco and has interacted with twenty four of them (e.g., for a historical/expected activity score of 5.3 percent for interactions occurring on video networks in San Francisco on summer weekends).

The content management system 302 can also determine a recent expected activity score by identifying recent interactions. For example, the content management system 302 can access recorded activity information occurring within the past week for the user 324/device 308 from the activity information datastore 331 and can determine that in the past week that the user 324/device 308 has been presented twenty two content items on a video network during the past week when in San Francisco and has interacted with eight of them (e.g., for a recent expected activity score of 36.4 percent for interactions occurring on video networks in San Francisco in the past week).

After determining an expected activity score, the content management system 302 can compare the expected activity score for the user/device to a threshold. For example, the threshold can be a predetermined activity score, such as a particular interaction rate (e.g., 10%). The content management system 302 can determine whether the expected activity score for the user/device exceeds the threshold. If the expected activity score exceeds the threshold, the content management system 110 can select one or more content items of a first type of content, such as action-soliciting content, to serve to the user/device.

For instance, in the example above where the content management system 302 determines an expected activity score of 13.3% in response to the request for content for the content item slots 320 and 322 received from the user device 306 at the Oceanside home location of the user 310, the content management system 302 can determine that the expected activity score of 13.3% exceeds a threshold of 10%. The content management system 302 can select, for example, action-soliciting content, such as content matching keywords of other content displayed in the user interface 318, for presentation in the content item slots 320 and 322. For example, content items 334 and 336 are presented in the content items slots 320 and 322, respectively.

An expected activity score can be compared to other types of thresholds. For example, a recent expected activity score can be compared to an expected activity score determined from a longer time period (e.g., to determine whether the user is recently more or less active than in the past). For instance, in the example above where the content management system 302 determines a recent expected activity score of 36.4% and a longer-term expected activity score of 5.3% in response to the request for content for the content item slot 327 received from the user 324/device 308, the content management system can determine whether the difference between the recent expected activity score and the longer-term expected activity score exceeds a threshold (e.g., a threshold of 10%). For example, the content management system 302 can determine that the difference of 31.1% between the recent expected activity score and the longer-term expected activity score is more than the threshold, indicating that the user/device is recently more active than in the past (with respect to interacting with content displayed on a video network on summer weekends in San Francisco).

Other types of thresholds can be used. For example, a threshold can be or can be based on an average expected activity score determined for a group of users/devices. The content management system 110 can compare the user's expected activity score to the average expected activity score, for example, to determine whether the user is expected to be more or less active than an average user. The average expected activity score can be determined for the group of users based on information from the activity information database 331 that has a same or similar context to the context of the current request.

As described above, if the expected activity score is more than a threshold, a first type of content (e.g., action-soliciting content) can be served to the user/device. As another example, if the expected activity score is less than the threshold, a second type of content (e.g., informative content) can be served to the user in response to the request. For example, for users that may not be likely to interact with content, content that is informative can be served rather than content which solicits a direct response from the user/ device. A user/device that has a low expected activity score may, for example, be less likely to interact with content items due to, for example, not wanting to make purchases online. Displaying informative content to such a user/device can increase a likelihood that the user is interested in and interacts with such content.

For instance, in the example above where the content management system 302 determines an expected activity score of 2.24% for the user 310 in response to the request for content for the content item slots 314 and 316, the content management system 302 can determine that the expected activity score of 2.24% is less than a threshold of 10%. The content management system 302 can select two informative content items for presentation in the content item slots 314 and 316. A content item can be determined to be an informative item, for example, if an information score associated with the content item is above a threshold.

An information score for a content item can be, for example, a measure of whether the content item delivers information to the user rather than, for example, soliciting a direct response from the user. Inactive users may, for example, choose to not interact with content items that solicit a direct purchase because they are not interested in or not comfortable with making purchases online. For users who are inactive or generally nonresponsive, the content management system 302 can identify eligible content items which have a relatively high information score, based on an assumption that the users may find the information interesting and may be more likely to appreciate (e.g., helping to build brand recognition, loyalty, or other tangible or intangible benefits to the user and content sponsor) the content than other items with lower information scores.

The content management system 302 can, in response to receiving a request for content from the user device 304 and in response to determining that the user 310 is substantially inactive while at the San Diego location during weekday mornings, identify content items from a content database 332 that are eligible to be served (e.g., based on various criteria other than information score), and rank the identified content items, as illustrated by ranked content items 333. The content management system 302 can select content items 338 and 340 for the content slots 314 and 316, respectively, based on the content items 340 and 338 having the relatively highest information scores of the ranked content items 333, and can deliver the content items 338 and 340 to the user device 304, for presentation on the user device 306 (e.g., as illustrated in the user interface 312). While reference is made to using information scores in the rankings, other factors can be used to rank the items including bid amounts, bid type, keyword matching or other factors.

In some implementations, a higher information score threshold can be used for higher levels of inactivity/nonresponsiveness (e.g., for lower expected activity scores) and a lower information score threshold can be used for lower levels of inactivity/nonresponsiveness (e.g., for the highest expected activity scores that still meet a threshold for inactivity/nonresponsiveness). For example, the content management system 302 can determine that the user 310 while in San Diego on weekday mornings has an expected activity score that is more than a "very inactive" threshold and in response to such a determination, the content management system 302 can identify the ranked eligible content items 333 that have an information score that is more than a "very high information score" threshold (e.g., a threshold of eighty). That is, the content items 340 and 338, having information scores of ninety two and eighty one, respectively, can each be selected based on having an information score higher than the "very high information score" threshold of eighty. As another example, the content management system 302 can determine that the user 324 is "partially" (e.g., somewhat) inactive, but not "very inactive", and can select the content item 342 for display in the content slot 327 since the content item 342 is above a threshold of, for example, seventy, which is a "high information score" threshold that is different and lower than the "very high information score" threshold of eighty. The content item 342 can be selected rather than the content item 340 or the content item 336, if, for example, the content item 342 otherwise better matches other characteristics of the request (e.g., such as the subject matter of the video content item 325).

An information score for a content item can be determined based on a number and variety of factors. For example, the content (e.g., textual content) of a content item can be analyzed to determine how informative the content item is. For example, one or more keywords can be identified, where a particular keyword can indicate a particular type of informative content. For example, a keyword of "reviews" can be identified in the content items 338 and 342 and keywords of "tutorial" and "white paper" can be identified in the content item 342, where the identified keywords can contribute to a higher information score for the respective content item 338 or 342. As another example, an identified keyword can lower an information score for a corresponding content item. For example, keywords can indicate that the content item is directed towards soliciting a purchase from the user rather than presenting information to the user. For example, a keyword of "shopping" can be identified in the content item 322 and a keyword of "discount" can be identified in the content item 342.

Keywords can also be identified in a URL of a landing page that is associated with a content item. For example, a purchase-related keyword of "buy" can be identified in an "examplebuytix.com" URL included in the content item 334, resulting in the lowering of an information score associated with the content item 334. As another example, an "info" or "information" keyword can be identified in an "examplecarinfo.com" URL included in the content item 340, resulting in a raising of an information score associated with the content item 340. Particular URLs or particular domains can be categorized as either being informative or response-oriented, and the content management system 302 can either lower or raise an associated information score, respectively, in response to identifying a landing page associated with a content item as being classified as informative or response-oriented.

Content items may have one or more associated categories, and one or more of the associated categories can be identified as indicating that the content item is either informative or response-oriented. For example, a shopping category may be identified for the content item 336 and an information score associated with the content item 336 can be lowered in response to the identification. The format of a content item can indicate the likelihood that the content item is either informative or response-oriented. For example, some content item formats may be more likely to be associated with an online seller and the associated content item may therefore be more likely to be response-oriented than informative. As another example, the sponsor of the content item can indicate, for example, that the content item is more or less response-oriented than informative.

One or more conversion type(s) associated with a content item can indicate that a content item is either response-oriented or informative. For example, some content item sponsors may only have a goal of making sales, while some content item sponsors may have other goals, such as awareness. For example, the content item 322 may only have an associated conversion type of purchase, and accordingly, the content item 322 can be identified as likely being response-oriented and can be given a corresponding low information score. As another example, the content item 342 can include multiple conversion types, including purchase, site visit, download of white paper, etc., where some of the conversion types (e.g., download of white paper) indicate that the content item is informative. Accordingly, an information score associated with the content item 342 can be raised based on the identified information-oriented conversion type(s).

For some content items, an overall information score can be determined based on a combination of identified characteristics of the content item, wherein some characteristics result in lowering of an information score for the content item and some characteristics result in raising of the information score for the content item. For example, the content item 342 includes the response-oriented keyword of "discount", which may result in the lowering of an associated information score. However, the content item 342 includes information-oriented keywords of "tutorials", "white papers", and "reviews", which may result in the raising of an associated information score. The content item 342 may include more characteristics that result in raising of the associated information score than characteristics that result in lowering of the associated information score, so the overall information score for the content item 342 (e.g., seventy one) may be above a threshold (e.g., a threshold of seventy). As described above, the content item 342 may be selected for the content slot 327 if the content item 342 is "informative enough" for the user 324, since the user 324 may have been identified as being "partially" nonresponsive/inactive.

Figure 4:
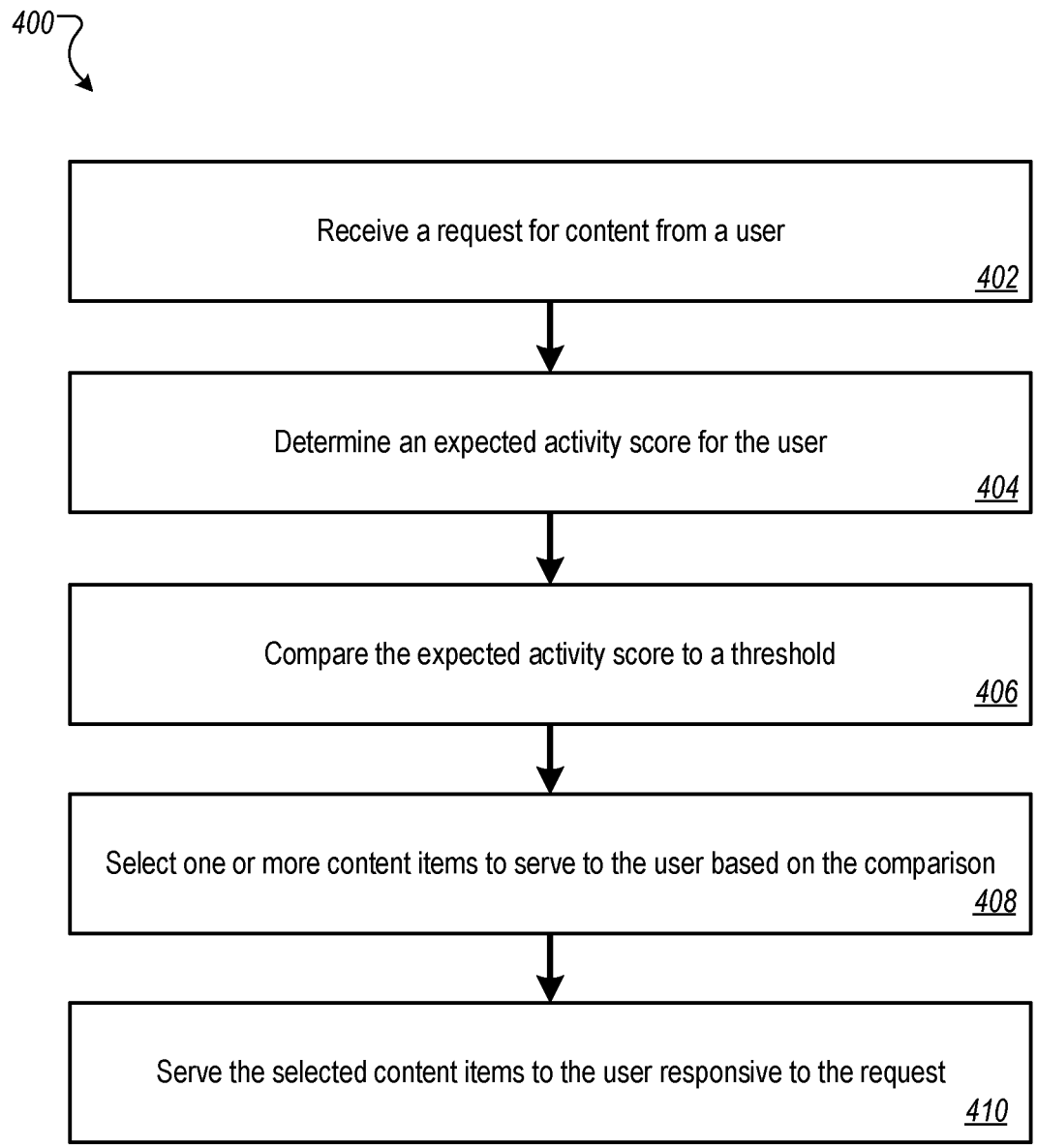
FIGS. 4 and 5 are flowcharts of example processes for providing content to a user.

FIG. 4 is a flowchart of an example process 400 for providing content to a user. The process 400 can be performed, for example, by the content management system 110 described above with respect to FIG. 1 or the content management system 302 described above with respect to FIG. 3. A request for content is received from a user (402). The request can be, for example, for content to be displayed in a slot associated with an online resource (e.g., a web property). The slot can be, for example, an advertisement slot.

An expected activity score is determined for the user based at least in part on one or more criteria associated with a context of presenting the online resource to the user (404). The criteria can include, for example, time of day, time of week, time of month, time of year, location of the user, type of device that the content is displayed on, a type of content network (e.g., a search network, a display network, a video network) that the content is displayed on, and/or other criteria. As another example, the criteria can relate to subject matter associated with the online resource. For example, the context may be viewing sports-related content in a particular location on a weekend.

The expected activity score can be a prediction of an expected interaction rate of the user given the context. The expected activity score can be determined based on a number of interactions by the user versus a number of opportunities for interaction in a time period. The time period can be, for example, one year, one month, two months, or some other time period. The time period can vary based on other factors, such as on one or more context criteria. The time period can be a recent time period, from a present point in time back a pre-defined amount of time in the past (e.g., a most recent one-week period). The expected activity score can be weighted based on dates of activities associated with the user, with more recent activities weighted higher than less recent activities. For example, activities occurring within the past week can be weighted twice as much as activities occurring more than one week in the past.

The expected activity score can be determined based on user interactions of other users that are similar to the user. For example, an estimated expected activity score can be determined for the user if no or less than a threshold amount of interaction data is available for the user. The estimated expected activity score can be determined based on available user activity data occurring in the context of the request, from users that are similar to the user (e.g., based on user demographics, interests, location, or other factors).

In some implementations, the content management system periodically (e.g., monthly) determines expected activity scores for users for one or more contexts and assigns a label to those user-context pairings based on the expected activity scores. For example, such processing can occur other than in response to a particular request for content (e.g., using a batch process). A label can be assigned to a user-context pairing if, for example, at least a threshold number of impressions have been presented to the user in the context in a predefined time period (e.g., the past year). Labels can include, for example, "active/average/inactive", indicating "more active than average within context", "substantially average activity within context", and "less active than average within context", respectively, or "recently active user/recently inactive user", indicating "recent increase in activity within context", and "recent decrease in activity within context", respectively. In response to a subsequent received request for content occurring in a context for which a label exists for a user, the content management system can determine content or a type of content to serve to the user based on the type of label assigned to the user for the context. For example, if an "inactive user" label is assigned to the user for the context, informative content can be served to the user.

The expected activity score for the user is optionally compared to a threshold (406). The threshold can be, for example, a predetermined expected activity level, such as a predetermined click-through rate (e.g., 10%). As another example, the threshold can correspond to a recent expected activity score determined for the user, where the recent expected activity score is determined based on user interactions by the user in a recent time period and where the recent time period is shorter than a time period used to determine a different, longer-term expected activity score. The longer-term expected activity score can be compared to the recent expected activity score to determine, for example, if the user has recently been more or less active than in the past.

The threshold can correspond to an average expected activity score determined for multiple users. For example, the average expected activity score can represent an expected activity score for all users in any given context. Comparing the expected activity score to the average expected activity score can determine whether the user is expected to be more or less active, in general, than other users. As another example, the average expected activity score can be determined based on user interactions occurring in a same or similar context to the context of the request. In such an example, comparing the expected activity score to the average activity score can determine whether the user is expected to be more or less active than other users in the context of the request.

One or more content items to serve to the user are selected, based at least in part on the score and/or the comparison (408). For example, action-soliciting content can be selected when the expected activity score is at or above the threshold and informative content can be selected when the expected activity score is below the threshold. As another example, content can be selected based on being associated with a campaign that includes criteria that is based on expected activity score. For example, a campaign can include criteria that specifies that content from the campaign is eligible to be selected if an expected activity score of a user for which content is requested is above a threshold. Based on determining that the expected activity score associated with the request is more than a threshold, content from such a campaign can be selected to be served to the user.

The selected content items are served to the user, responsive to the request (410). For example, action-soliciting or informative content can be served. Served content can be presented to the user, such as in one or more content slots.

Figure 5:
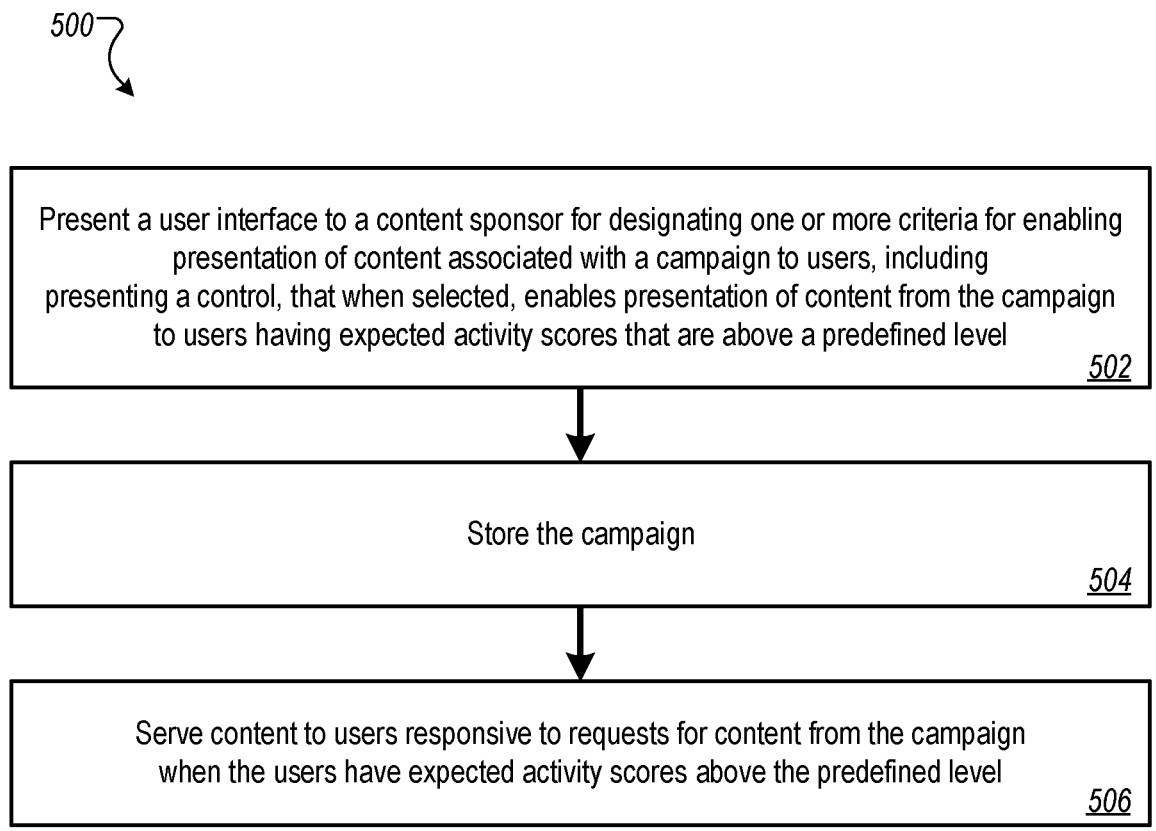

FIG. 5 is a flowchart of an example process 500 for providing content to a user. The process 500 can be performed, for example, by the content management system 110 and/or other systems described above with respect to FIG. 1 or the content management system 302 described above with respect to FIG. 3.

A user interface is presented to a content sponsor (502). The user interface can be presented for designating one or more first criteria for presenting content associated with a campaign to users. Presenting the user interface can include presenting a control, that when selected, enables presentation of content from the campaign to users having expected activity scores that are above a predefined target level. For example, the user interface 200 of FIG. 2 can be presented to a content sponsor, where the user interface 200 includes, among other controls, controls 216*a*, 216*b*, and 216*c*. If the user selects, for example, the control 216*c*, content for a selected campaign can be presented to users having an expected activity score higher than an expected activity score associated with a "high" activity level.

The campaign is stored (504). For example, parameters for the campaign, including the first criteria, can be stored in a database (e.g., the parameters data store 112 of FIG. 1 or the datastore 330 of FIG. 3).

Content is served to users responsive to requests for content from the campaign when the users have expected activity scores above the predefined target level (506). For example, one or more content items from the campaign can be selected. For example, with respect to FIG. 3, in response to determining that the expected activity score associated with a request for content from Oceanside from the user device 306 is more than a threshold, the content items 334 and 336 can be selected. The content items that are selected may be, for example, action-soliciting content items.

Figure 6:
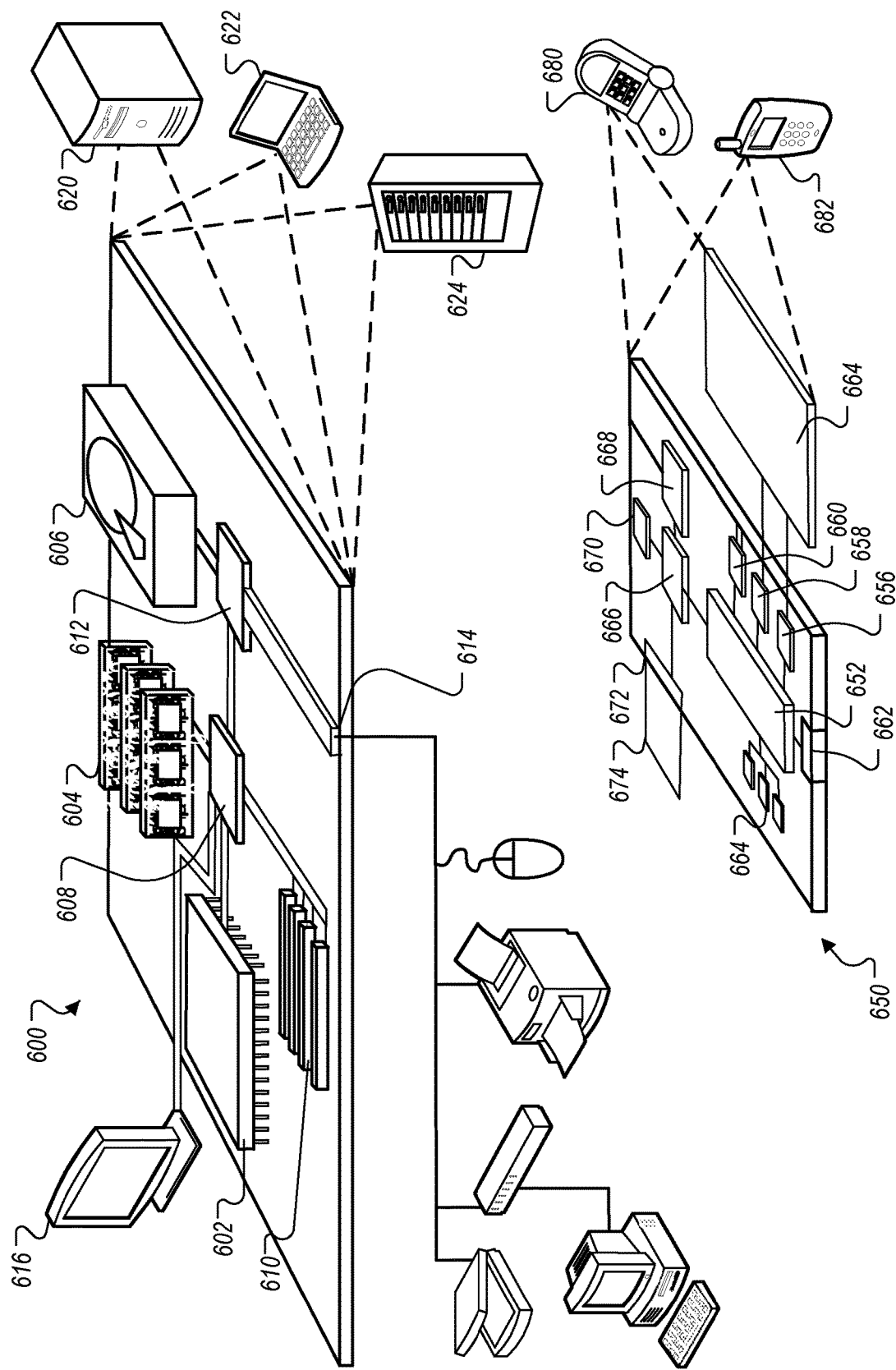
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer implemented method comprising:
   receiving, by one or more processors, historical activity data specifying activities of a user over time;
   determining, by one or more processors and based on the historical activity data, that a change in interaction level with an application, by the user and over time, meets a pre-specified activity level;
   selecting, by the one or more processors, a first content item to serve to the user based at least in part on the change in interaction level by the user over time meeting the pre-specified activity level, wherein the first content item is selected from among a set of content items that also includes a second content item that is selected when the change in activity does not meet the pre-specified activity level; and
   serving the first content item, rather than the second content item, to the user responsive to the determination that the change in interaction by the user over time meets a pre-specified activity level.

2. The method of claim 1, wherein the change in interaction level is determined based on a number of completed interactions by the user.

3. The method of claim 1, wherein determining the change in interaction level comprises determining the change in interaction level over a recent period between a present point in time and a pre-defined amount of time in the past.

4. The method of claim 1, wherein the change in interaction level corresponds to an average level of activity.

5. The method of claim 1, wherein selecting a first content item comprises selecting action-soliciting content.

6. The method of claim 1, wherein selecting a first content item comprises selecting informative content.

7. A computer program product tangibly embodied in a computer-readable storage device and comprising instructions that, when executed by a processor, cause the processor to perform operations comprising:
   receiving historical activity data specifying activities of a user over time;
   determining, based on the historical activity data, that a change in interaction level with an application, by the user and over time, meets a pre-specified activity level;
   selecting a first content item to serve to the user based at least in part on the change in interaction level by the user over time meeting the pre-specified activity level, wherein the first content item is selected from among a set of content items that also includes a second content item that is selected when the change in activity does not meet the pre-specified activity level; and
   serving the first content item, rather than the second content item, to the user responsive to the determination that the change in interaction by the user over time meets a pre-specified activity level.

8. The computer program product of claim 7, wherein the change in interaction level is determined based on a number of completed interactions by the user.

9. The computer program product of claim 7, wherein determining the change in interaction level comprises determining the change in interaction level over a recent period between a present point in time and a pre-defined amount of time in the past.

10. The computer program product of claim 7, wherein the change in interaction level corresponds to an average level of activity.

11. The computer program product of claim 8, wherein selecting a first content item comprises selecting action-soliciting content.

12. The computer program product of claim 7, wherein selecting a first content item comprises selecting informative content.

13. A system comprising:
    one or more computers and one or more storage devices storing instructions that are operable, when executed by the one or more computers, to cause the one or more computers to perform operations comprising:
    receiving historical activity data specifying activities of a user over time;
    determining, based on the historical activity data, that a change in interaction level with an application, by the user and over time, meets a pre-specified activity level;
    selecting a first content item to serve to the user based at least in part on the change in interaction level by the user over time meeting the pre-specified activity level, wherein the first content item is selected from among a set of content items that also includes a second content item that is selected when the change in activity does not meet the pre-specified activity level; and
    serving the first content item, rather than the second content item, to the user responsive to the determination that the change in interaction by the user over time meets a pre-specified activity level.

14. The system of claim 13, wherein the change in interaction level is determined based on a number of completed interactions by the user.

15. The system of claim 13, wherein determining the change in interaction level comprises determining the change in interaction level over a recent period between a present point in time and a pre-defined amount of time in the past.

16. The system of claim 13, wherein the change in interaction level corresponds to an average level of activity.

17. The system of claim 13, wherein selecting a first content item comprises selecting action-soliciting content.

18. The system of claim 13, wherein selecting a first content item comprises selecting informative content.

* * * * *